US006482524B1

(12) United States Patent
Yamamoto et al.

(10) Patent No.: US 6,482,524 B1
(45) Date of Patent: Nov. 19, 2002

(54) SUBSTRATE HAVING A TREATMENT SURFACE

(75) Inventors: Hiroaki Yamamoto, Osaka (JP); Kazutaka Kamitani, Osaka (JP); Hiroaki Kobayashi, Osaka (JP); Takashi Sunada, Osaka (JP); Toyoyuki Teranishi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/036,927

(22) Filed: Mar. 9, 1998

(30) Foreign Application Priority Data

Mar. 11, 1997 (JP) .............................................. 9-056342

(51) Int. Cl.⁷ ............................ B32B 17/06; C09K 3/18
(52) U.S. Cl. ....................... 428/429; 428/141; 428/142; 428/448; 428/450; 428/451
(58) Field of Search ................................. 427/164, 168, 427/169, 387, 388.1, 389.7, 393.4; 428/141, 429, 448, 450, 451

(56) References Cited

U.S. PATENT DOCUMENTS

| 5,328,768 A | * | 7/1994 | Goodwin ..................... 428/428 |
| 5,459,198 A | | 10/1995 | Sharp .......................... 525/102 |
| 5,550,184 A | | 8/1996 | Halling ........................ 524/837 |
| 5,552,476 A | | 9/1996 | Halling ........................ 524/837 |

FOREIGN PATENT DOCUMENTS

| EP | 0 484 746 | 5/1992 |
| EP | 0 545 201 | 6/1993 |
| EP | 0 547 550 | 6/1993 |
| JP | 2-311332 | 12/1990 |
| JP | 4-20781 | 4/1992 |
| JP | 5-86353 | 4/1993 |
| JP | 5-161844 | 6/1993 |
| JP | 2525536 | 5/1996 |
| WO | WO 96/06895 | 3/1996 |

OTHER PUBLICATIONS

Derwent Publications; Database WPI; Section Ch, Week 9218; JP 04 020 781, 04/06/92.

Patent Abstracts of Japan; vol. 015, No. 100; Mar. 11, 1991; JP 02 311332.

C. J. Brinker and G. W. Scherer, Sol→Gel→Glass: Gelation and Gel Structure, Journal of Non–Crystalline Solids 70 (1985) 301–322 No Month.

* cited by examiner

*Primary Examiner*—D. S. Nakarani
(74) *Attorney, Agent, or Firm*—Merchant & Gould P.C.

(57) ABSTRACT

For obtaining a substrate on the surface of which a water repellent film is firmly bonded through an undercoating film, and which shows a low critical inclination angle, superior durability, and high density, a water repellent and/or oil repellent film layer is formed by using a liquid for undercoating treatment. The liquid for undercoating treatment is obtained by dissolving and reacting a material having chlorosilyl radicle radicle in molecular form therein and is dissolved into an alcohol group solvent, so that a surface roughness (Ra) of less than 0.5 nm is obtained, thereby achieving high durability and a low critical inclination angle.

6 Claims, No Drawings

SUBSTRATE HAVING A TREATMENT SURFACE

BACKGROUND OF THE INVENTION

1. Field of the Invention

The present invention relates to a substrate of glass, ceramics, plastic, or metal, etc., having a treatment surface, i.e., a water repellent coating or film being formed on an undercoating layer or film thereof, and a treatment method therefor.

2. Description of Related Art

Conventionally, a substrate comprising for example glass or the like, on the surface of which a water repellent coating, layer or film is formed, has been already known, in for example, Japanese Patent Publication No. Hei 4-20781 (1992), Japanese Laid-open Patent No. Hei 5-86353 (1993), Japanese Laid-open Patent No. Hei 5-161844 (1993), Japanese Laid-open Patent No. Hei 2-311332 (1990) and Japanese Patent No. 2,525,536.

In Japanese Patent Publication No. Hei 4-20781 (1992), it is disclosed that on the surface of the substrate there is formed a coating layer or film from a silane compound excluding polyfluoro radicle or synthetic resin, and further thereon is formed a water repellent and oil repellent multilayer coating or film comprising a silane compound including polyfluoro radicle.

Further, in Japanese Laid-open Patent No. Hei 5-86353 (1993), there is disclosed a method by which a thin film of siloxan radicle is formed on the surface of glass, ceramics, plastic, or metal, etc., by use of a compound including chlorosilyl radicle, such as $SiCl_4$, in molecular form thereof, and further thereon is formed a chemical absorption unimolecular accumulation layer or film (a water repellent film or coating).

Also in Japanese Laid-open Patent No. Hei 5-161844 (1993), there is described a method in which, having formed a unimolecular film of siloxan radicle or an absorption film of polysiloxan previously, the chemical absorption unimolecular film (a water repellent film or coating) is formed on the surface of a substrate by a further chemical absorption processing conducted in an atmosphere including a surface-active agent of chlorosilane radicle.

Moreover, Japanese Laid-open Patent No. Hei 2-311332 (1990) describes a water repellent glass obtained through silylating the surface of glass substrate by a silyl compound, such as fluorinated alkylsilane, the surface of which is formed from a metal oxide, such as $SiO_2$.

Furthermore, Japanese Patent No. 2,523,536 discloses that an undercoating film or layer of silica is applied on the glass substrate before treating the surface thereof by the fluorine compound, in the same manner as described in Japanese Laid-open Patent No. Hei 2-311332 (1990), and further that weather resistance of the water repellent film is improved by including olefin telomer in the fluorine compound.

With the substrate which can be obtained by the method disclosed in Japanese Patent Publication No. Hei 4-20781 (1992), since the density of the undercoating layer is low, the undercoating layer must be more than 100 nm in thickness thereof and also the temperature for baking must be higehr than 400° C.

In the method disclosed in Japanese Laid-open Patent No. Hei 5-86353 (1993), since the absorbent for the reaction to water in air is unstable, it is necessary to maintain the humidity in the atmosphere low, thereby control of the environment being difficult. Further, there are problems, in that it takes 2–3 hours for the treatment, and the nonaqueous solvent is expensive.

For implementation of the method which is disclosed in Japanese Laid-open Patent No. Hei 5-161844 (1993), equipment for controlling the atmosphere must be large-scaled, and it takes time to form a perfect absorption film.

With the substrate which is obtained by the method disclosed in Japanese Laid-open Patent No. Hei 2-311332 (1990), since baking at 500° C. for instance is necessitated for obtaining the high density metal oxide layer when forming the metal oxide film through a sol-gel method, also large-scaled equipment for baking the substrate at high temperature is necessary, thus raising the production cost. Further, having tried this method, the roughness of the metal oxide film thereby obtained is relatively high, resulting that it is difficult for water drops present on the surface of the water repellent glass to roll freely thereon.

Furthermore, with the substrate which is obtained by the method disclosed in Japanese Patent No. 2,525,536, though being superior with respect to weather resistance, such a result is only obtained through double-checking thereof that the durability of the water repellent film in a friction test is not adequate, and it is also difficult for water drops present on the surface of the water repellent glass to roll freely thereon since the roughness of the surface of the silica undercoating layer or coating is relatively high.

SUMMARY OF THE INVENTION

For resolving the drawbacks in the conventional art mentioned above, according to the present invention, there is provided a substrate having a treatment surface, characterized in that, on a surface of a substrate of glass, ceramics, plastics or metal, an undercoating film layer is formed by drying a liquid for undercoating treatment which is obtained by dissolving and reacting a material having chlorosilyl radicle in molecular form therein within an alcohol group solvent, so that on said undercoating film layer there is formed a water repellent or oil repellent layer, wherein a surface roughness (Ra) of said surface layer is equal to or less than 0.5 nm.

Further, the surface roughness (Ra) of the surface layer is preferably to be as small as possible. However, for example, the surface roughness (Ra) of a fire polished surface of float glass (i.e., upper surface of the float glass floating on molten tin) is about 0.2 nm, and the roughness (Ra) of a glass surface obtained through precise grinding is about 0.1 nm. Therefore, the substantially lowest threshold value of surface roughness (Ra) of the glass surface which can be obtained is about 0.1–0.2 nm.

As mentioned above, the undercoating film or layer formed from the undercoating treatment liquid, which is obtained by dissolving and reacting the material having chlorosilyl radicle in molecular form therein within an alcohol group solvent, has high smoothness, and therefore, the surface layer formed on the undercoating film or layer also comes to have high smoothness (Ra≦0.5 nm), reflecting the smoothness of the undercoating layer, thereby obtaining a superior water repellent property, i.e., a high contact angle and a low critical inclination angle.

Here, it is possible to remove defects in appearance by keeping the surface of the substrate clean when forming the undercoating layer or film on it, and it is also possible to increase adhesive strength between the substrate surface and the undercoating film by activating the surface of the substrate. For example, even in a case where the glass substrate comprises an oxide, it is possible to form an active surface by grinding the surface to within $0.5\ nm \leq Ra \leq 3.0\ nm$ using a grinding agent.

However, in the case where the roughness (Ra) of the substrate surface exceeds 3.0 nm, it is difficult to make the roughness (Ra) of the surface layer (the water repellent layer) less than 0.5 nm even if effecting the undercoating treatment thereon. Therefore, it is preferable that the roughness (Ra) of the substrate surface be equal to or less than 3.0 nm. Moreover, when the substrate is made of glass plate, transparency of the substrate can be maintained when the roughness (Ra) is within a range of $0.5\ nm = Ra \leq 3.0\ nm$.

Further, in the case where hydrophilic radicle is poor in the surface of the substrate, it is preferable to conduct the surface treatment after treatment for hydrophilizing the surface, i.e., by treating the surface with plasma containing oxygen or treating under a corona discharge atmosphere, or alternatively, by irradiating ultraviolet light of a wavelength in the vicinity of from 200 to 300 nm onto the substrate surface in an atmosphere containing oxygen.

Further, according to the present invention, it is appropriate to restrict the concentration of the material having chlorosilyl radicle in molecular form therein within the liquid for the undercoating treatment, this being equal to or greater than 0.01 wt % and equal to or less than 3.0 wt %.

As an example of a material having chlorosilyl radicle radicle in molecular form therein, there can be listed $SiCl_4$, $SiHCl_3$ or $SiH_2Cl_2$, etc., and it is possible to select a single or a plurality of materials from among these as the material. In particular, since it contains the most Cl radicles, $SiCl_4$ is preferable. The chlorosilyl radicle is very high in reactivity thereof, and it forms a minute or dense undercoating film through a self-condensation reaction or by reaction to the substrate surface. However, it can contain a material in which a part of a hydrogen is replaced by methyl radicle or ethyl radicle.

Further, as the alcohol group sovlent, for example, methanol, ethanol, 1-propanol, and 2-propanol are desirable. The material containing chlorosilyl radicle in molecular form therein and the alcohol group solvent, as is shown by equation (1) below, react to form alkoxide by removing hydrogen chloride:

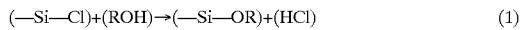

(—Si—Cl)+(ROH)→(—Si—OR)+(HCl)  (1)

Further, the material containing chlorosilyl radicle in molecular form therein and the alcohol group solvent react as shown by equation (2) below:

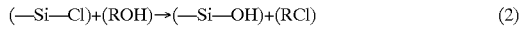

(—Si—Cl)+(ROH)→(—Si—OH)+(RCl)  (2)

In the alcohol solvent, a part of (—Si—OR) reacts as shown by equation (3) below with an acidic catalyst which is formed as shown by equation (1), and forms (—Si—OH).

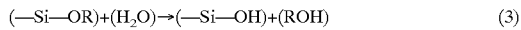

(—Si—OR)+(H₂O)→(—Si—OH)+(ROH)  (3)

In addition, (—Si—OH) which is produced as shown by the above equations (2) and (3) reacts as shown by equation (4) below, and forms siloxane bonding:

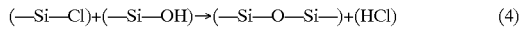

(—Si—Cl)+(—Si—OH)→(—Si—O—Si—)+(HCl)  (4)

It is considered that, by means of the above-mentioned siloxane bonding, the bonding between the substrate and the undercoating film, or between the undercoating film and the surface film such as the water repellent film is strengthened. Namely, in the case where a compound including the siloxane bonding is simply used as the liquid for the undercoating treatment as disclosed in the conventional arts, though the siloxane bonding exists within the undercoating film, the siloxane bonding joining between the substrate and the undercoating film, or between the undercoating film and the water repellent film, are not so influential.

According to the present invention, by treating with a liquid for performing an undercoating treatment which is obtained by reacting the material having chlorosilyl radicle radicle in molecular form in the alcohol group solvent within thirty (30) minutes after mixing thereof, an undercoating film being superior in smoothness can be formed, and since a part of the chlorosyl radicle takes part in the siloxane bonding, good bonding between the substrate and the water repellent film can be obtained by the siloxane bonding.

Here, it is preferable that the concentration of the material having chlorosilyl radicle in molecular form therein contained in the undercoating treatment liquid, though depending on the method of coating be equal to or greater than 0.01 wt % and equal to or less than 3.0 wt %. If it is lower than that, no effect by adding the material can be obtained, and if higher than that, the effect of adding the material is not improved. For example, in particular, in the case of coating by using, for example, a curtain flow coating method, judging from the appearance during the coating, it is preferable that the concentration be equal to or greater than 0.3 wt % and equal to or less than 1.0 wt %.

The method for coating the undercoating treatment liquid should not be limited in particular. However, other methods can be listed, such as: a dip coating method, a curtain flow coating method, a spin coating method, a bar coating method, a roll coating method, a hand coating method, a brush painting method, a spray coating method, etc.

Further, as the surface treatment, for instance, a water repellent treatment and an oil repellent treatment can be listed. Though the liquid agents for the water and oil repellent treatments should not be limited in particular, a treating method by using water repellent or oil repellent agents containing silane compound, siloxane compound or silicon compound therein is preferable.

As the silane compound, there can be listed water repellent agents containing:

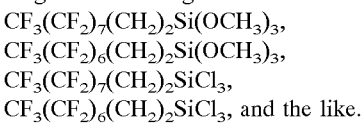

$CF_3(CF_2)_7(CH_2)_2Si(OCH_3)_3$,
$CF_3(CF_2)_6(CH_2)_2Si(OCH_3)_3$,
$CF_3(CF_2)_7(CH_2)_2SiCl_3$,
$CF_3(CF_2)_6(CH_2)_2SiCl_3$, and the like.

These repellent agents can be used, depending on necessity, by being hydrolyzed using a catalyst such as acid or base. Further, an agent, containing the siloxane compound which can be obtained through hydrolysis or condensation of the silane compound, can be used too.

As the silicon compound there can be used polydimethylsiloxane of straight chain or chain form, or silanol metamorphism, alkoxide metamorphism, hyrogen metamorphism, halogen metamorphism thereof, etc.

For the method for the water repellent or oil repellent treatment, in the same manner as the undercoating treatment, though it should not be limited in particular, methods such as the hand coating method, the brush painting method, etc., can be applied thereto.

Further, as the surface treatment according to the present invention, a hydrophilic treatment or an antifogging treatment can be applied, in addition to the water repellent or oil repellent treatment.

DESCRIPTION OF THE PREFERRED EMBODIMENTS

Hereinafter, detailed explanation of the embodiments according to the present invention will be given.

Embodiment 1

By adding 0.01 g of chlorosilane ($SiCl_4$, produced by Shinnetsu Silicon Co.) to 100 g of ethanol (produced by Nacalai Tesque, Inc.) and mixing thereof, a liquid for the undercoating treatment is obtained. The obtained liquid for the undercoating treatment was coated on a glass plate (300×300 mm) which was ground and cleaned, under a humidity of 40% and at room temperature, and was then dried for about one minute, thereby obtaining the undercoating film.

Then, by dissolving 1.3 g of $CF_3(CF_2)_7(CH_2)_2Si(OCH_3)_3$ heptadecafluorodecyltrimethoxisilane produced by Toshiba Silicon Co.) into 40.6 g of ethanol and mixing them for an hour, and thereafter by adding 0.808 g of ion-exchanged water and 0.1 g of 0.1 hydrochloric acid and mixing them for a further one hour, an agent A for the water repellent treatment was obtained.

Thereafter, 3 ml of agent A for the water repellent treatment was put onto a cotton applicator and it was coated onto the glass substrate with a film formed by the undercoating treatment, and thereafter any agent for water repellent treatment which was excessively coated is removed by wiping with a fresh cotton applicator soaked in ethanol, thereby obtaining a water repellent glass substrate.

The contacting angle with water drops of 2 mg in size was measured as a static contact angle by using a contact goniometer (CA-DT, produced by Kyowa Kaimen Kagaku Co.).

As a weather resistance test, ultraviolet light was irradiated there onto by using Super UV tester (W-13, produced by Iwasaki Denki Co.), under the conditions of an ultraviolet light strength of 76±2 $mW/cm^2$, irradiating for 20 hours with a darkness cycle of 4 hours, and by showering the substrate with ion-exchanged water for 30 seconds every hour.

Further, as an abrasion test, a sand-rubber eraser (product by Lion Co., No. 502) was rubbed on the water repellent glass reciprocally 100 times at a load of 50 g per 15×7 sq. mm.

Moreover, as a measure for indicating the water repellency, the critical inclination angle was measured. For measuring the performance of rolling a water drop on the surface of the water repellent glass (contact angle= 100–110°), a water drop of diameter 5 mm (it comes to be approximately semicircular in shape if the contact angle is 100–110°) was disposed on the surface of the water repellent glass which is horizontally positioned. Then, the water repellent glass plate was inclined gradually, and the inclination angle (the critical inclination angle) when the water drop disposed on the surface of the water repellent glass begins rolling was recorded. The smaller the critical inclination angle, the better in dynamic repellent property. For instance, this applies to rain drops landing on the front windshield glass of a moving automobile which must be easily splashed or scattered away so that they do not interrupt the view of the driver.

However, as the smoothness of the obtained water repellent glass, the surface roughness (Ra), is calculated by measuring the surface contour with an atomic force microscope (AFM) (SPI3700, produced by Seiko Instruments Inc.) by a cyclic contact mode.

As shown in TABLE 1, an initial contact angle was 108°, an initial critical inclination angle 13°, and the contact angle after the weather resistance test of 400 hours was 88°, and that after the abrasion test is 84°, serving as a measure of the durability thereof.

Comparison 1

A water repellent glass substrate was obtained in the same manner as in embodiment No. 1, except that 0.005 g (0.005 wt %) of chlorosilane was added in the preparation of the liquid for the undercoating treatment.

As shown in TABLE 1, though an initial contact angle of 107° is indicated, the initial inclination angle is large, at 18°, and the contact angle after the weather resistance test came down to 71°, thereby indicating that the durability is reduced.

Embodiments 2 to 4 and Comparison 2

Water repellent glass substrates were obtained in the same manner as in embodiment No. 1, except that 0.5 g, 1.0 g, 3.0 g and 5.0 g (0.5 wt %, 1.0 wt %, 3.0 wt % and 5.0 wt % in concentration) of chlorosilane were added to the respective preparations of the liquid for the undercoating treatment.

That is to say, in embodiment 2, 0.5 g (0.5 wt % in concentration) of chlorosilane was added. In embodiment 3, 1.0 g (1.0 wt % in concentration) of chlorosilane was added. In embodiment 4, 3.0 g (3.0 wt % in concentration) of chlorosilane was added. And in comparison 1, 5.0 g (5.0 wt % in concentration) of chlorosilane was added.

When the concentration of chlorosilane is high, the thickness of the undercoating becomes thick, and as a result of this, the interference of light is gradually strengthened. When it exceeds 5 wt % in concentration thereof, a remarkable increase in color reflection can be distinguished. When the concentration of chlorosilane rises further so as to increase the thickness of the undercoating layer, a baking process is additionally required.

Embodiment 5

In a 1 liter glass reactor having a thermometer, a mixer and a cooler, 10.0 g of polydimethylsiloxane containing hydrolysis radicle, which is expressed by the chemical equation shown below, was reacted with 10.0 g of $CF_3(CF_2)_7(CH_2)_2Si(OCH_3)_3$ (heptadecafluorodecyltrimethoxisilane, produced by Toshiba Silicon Co.) together with 360 g of t-buthanol and 1.949 of 0.1 N hydrochloric acid in a co-hydrolysis reaction for 5 hours at a temperature of 80° C., and further 160 wt % of n-hexane was added and mixed for 10 hours at room temperature.

[Chemical Equation 1]

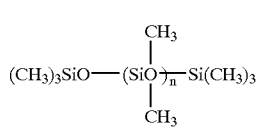

Further, by adding 10.0 g of organopolysiloxane which is expressed by the chemical equation 2 shown below and 5.0 g of methasulfonic acid into the mix and mixing them for 10 minutes, an agent B for the water repellent treatment was obtained.

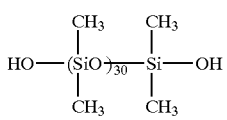

[Chemical Equation 2]

By coating the agent for water repellent treatment on the undercoated glass substrate which is produced at a 0.5 wt % concentration of $SiCl_4$, in the same manner as in embodiment 1, a water repellent glass substrate is obtained.

Also with this repellent glass substrate, as shown in the TABLE 1, superior results can be obtained in the initial contact angle and the durability (i.e., the weather resistance test and the abrasion test).

Comparisons 3 and 4

After the undercoating treatment using tetrachlorotin or tetrachlorozirconium as the agent for the undercoating treatment in place of chlorosilane, the water repellent glass substrate was produced by using the above-mentioned agent B for water repellent treatment thereof.

Though they show 106° for the initial contact angle, however, the initial critical inclination angles thereof became large, such as 18° and 19°, and the contact angles after the weather resistance test were reduced to 65° and 64°, respectively.

Comparison 5

The water repellent glass substrate was produced in the same manner as in embodiment 1 except that as the solvent for the undercoating treatment liquid, chloroform was used in place of ethanol.

Though TABLE 1 shows a large contact angle at 107°, however, the initial critical inclination angle is large, such as 20°, and the contact angle after the weather resistance test was reduced to 63° and the contact angle after the abrasion test was also reduced to 67°.

Comparison 6

Comparison 6 was performed for double-checking embodiment 6 which is disclosed in the specification of Japanese Patent No. 2,525,536.

Namely, the water repellent glass substrate was obtained in the same manner as in embodiment 1 except that as the solvent for the undercoating treatment liquid perfluorocarbon solution (FC-77, produced by 3M Co.) was used in place of ethanol.

The results show a high value for the surface roughness (Ra) at 7.0 nm, and also a high value for the initial critical inclination angle at 25°. Also, though it shows the initial contact angle at 107°, the contact angle thereof after the abrasion test was reduced to 65°.

Comparison 7

Comparison 7 was performed for double-checking embodiment 3 which is disclosed in Japanese Laid-open Patent No. Hei 2-31132 (1990) cited above as the prior art.

Namely, dissolving and mixing 31 g of tetraethylsilicate (produced by Colcoat Co.) into 380 g of ethanol while adding and mixing 6.5 g of water and 1.6 g of 1N hydrochloric acid, and mixing for 24 hours at a temperature of 20° C., the liquid for the undercoating treatment was prepared.

This liquid for the undercoating treatment was painted by the flow coating method in the same manner as in embodiment 1 and was dried in about a minute. After the undercoating treatment, a layer of silicon oxide was formed through a heating process by heating the substrate for an hour at a temperature of 500° C. Thereafter, the water repellent glass substrate was obtained by using the above-mentioned agent A for the water repellent treatment, in the same manner as in embodiment 1.

The surface roughness (Ra) shows a high value at 0.6 nm, and the initial critical inclination angle is also high, at 22°. The contact angle was 107°, however, it went down to 67° after the abrasion test.

Comparison 8

The water repellent glass substrate was obtained in the same manner as in comparison 7 except that the heating process of the undercoating film is not conducted.

The surface roughness (Ra) shows a high value at 0.7 nm, and the initial critical inclination angle was also high at 23°. The contact angle is 108°, however, it went down to 45° after the abrasion test.

Completing the results of the embodiment and comparisons mentioned heretofore, they are arranged and shown in TABLE 1.

TABLE 1

| | Ingredients for Undercoating Treatment (Concentration wt %) | Agent for Water Repellent Treatment | Appearance | Surface Roughness Ra (nm) | Initial Contact Angle (°) | Initial Critical Inclination Angle (°) | Contact Angle (°) after Weather Resistance Test (400 H) | Contact Angle (°) after Abrasion Test (100 times) |
|---|---|---|---|---|---|---|---|---|
| Embodiment 1 | $SiCl_4$/0.01 | agent A | OK | 0.4 | 108 | 13 | 82 | 84 |
| Comparison 1 | $SiCl_4$/0.005 | agent A | OK | 0.9 | 107 | 18 | 71 | 65 |
| Embodiment 2 | $SiCl_4$/0.5 | agent A | OK | 0.2 | 107 | 12 | 86 | 82 |
| Embodiment 3 | $SiCl_4$/1.0 | agent A | OK | 0.3 | 108 | 12 | 87 | 87 |
| Embodiment 4 | $SiCl_4$/3.0 | agent A | OK | 0.2 | 109 | 13 | 86 | 87 |
| Comparison 2 | $SiCl_4$/5.0 | agent A | remarkable reflection color | 0.3 | 107 | 12 | 87 | 84 |
| Embodiment 5 | $SiCl_4$/0.5 | agent B | OK | 0.2 | 108 | 12 | 88 | 86 |
| Comparison 3 | $SiCl_4$/1.0 | agent B | OK | 0.7 | 106 | 18 | 65 | 80 |
| Comparison 4 | $SiCl_4$/1.0 | agent B | OK | 0.6 | 106 | 19 | 64 | 83 |
| Comparison 5 | $SiCl_4$/1.0*1 | agent A | OK | 0.8 | 107 | 20 | 63 | 67 |
| Comparison 6 | $SiCl_4$/1.0*2 | agent A | OK | 7.0 | 107 | 25 | 80 | 65 |
| Comparison 7 | TEOS/0.4*3 | agent A | OK | 0.7 | 107 | 22 | 54 | 67 |

TABLE 1-continued

|  | Ingredients for Under- coating Treatment (Concentration wt %) | Agent for Water Repellent Treatment | Appearance | Surface Rough- ness Ra (nm) | Initial Contact Angle (°) | Initial Critical Inclination Angle (°) | Contact Angle (°) after Weather Resistance Test (400 H) | Contact Angle (°) after Abrasion Test (100 times) |
|---|---|---|---|---|---|---|---|---|
| Comparison 8 | TEOS/0.4*3 | agent A | OK | 0.7 | 108 | 23 | 50 | 45 |

*1 solvent: Chloroform
*2 solvent: perfluorocarbon
*3 solvent: see lines 23–28 of page 15
Ra was measured based on the standard of JIS B 0601-1982

As is fully explained in the above in accordance with the substrate and the treating method of the present invention, since a highly reactive compound including chlorosilyl radicle in molecular form thereof is used as the liquid for the undercoating treatment, there is no necessity for conducting the baking at high temperature after forming the undercoating film layer. As a result, no large-scaled equipment is necessitated, and the production cost can be reduced.

Further, since it is sufficient for the agent for the undercoating treatment to be painted without using a liquid phase absorption or gaseous phase absorption method, the time for the treating can be shortened, and by using a low-cost alcohol solvent, the liquid for the undercoating treatment can painted uniformly and thinly.

What is claimed is:

1. A substrate formed of glass, ceramics, plastics or metal having a treatment surface comprising:

an undercoating film layer on said treatment surface of said substrate formed by drying a liquid for undercoating treatment on said treatment surface said liquid comprising a chlorosilyl radical and an alcohol group solvent including hydrogen chloride formed in an elimination reaction; and a water repellent or oil repellent layer on said undercoating film layer having a surface roughness (Ra) equal to or less than 0.5 nm wherein siloxane bonding takes place between the undercoating layer and the surface of said substrate and the undercoating layer and said water repellent or oil repellent layer.

2. A substrate having a treatment surface as defined in claim 1, wherein the concentration of chlorosilyl radical contained in said liquid for undercoating treatment is equal to or greater than 0.01 wt % and equal to or less than 3.0 wt %.

3. A substrate having a treatment surface as defined in claim 1, wherein the concentration of chlorosilyl radical contained in said liquid for undercoating treatment is equal to or greater than 0.03 wt % and equal to or less than 1.0 wt %.

4. A substrate having a treatment surface as defined in claim 1, wherein said liquid for undercoating treatment includes at least one of $SiCl_4$, $SiHCl_3$ and $SiH_2Cl_2$.

5. A substrate having a treatment surface as defined in claim 1, wherein the surface of said substrate on which said undercoating film layer is formed is ground and cleaned to a surface roughness (Ra) of around from 0.5 nm to 3.0 nm.

6. A substrate having a treatment surface as claimed in claim 1, wherein said undercoating treatment is conducted within 30 minutes after preparing said liquid for undercoating treatment.

* * * * *